United States Patent [19]

Devlin

[11] 4,325,062
[45] Apr. 13, 1982

[54] MONITOR FOR BUS DESTINATION SIGNS

[75] Inventor: Thomas A. Devlin, Waterford, Mich.

[73] Assignee: Vultron, Incorporated, Waterford, Mich.

[21] Appl. No.: 101,395

[22] Filed: Dec. 6, 1979

[51] Int. Cl.³ .............................................. G09G 3/00
[52] U.S. Cl. .................................. 340/717; 340/378.2; 340/716
[58] Field of Search .................... 340/378.2, 806, 809, 340/810, 715, 716, 717, 378.5

[56] References Cited

U.S. PATENT DOCUMENTS

| | | | |
|---|---|---|---|
| 2,552,112 | 5/1951 | Pierce | 340/810 |
| 2,843,952 | 7/1958 | Zgraggen | 340/806 |
| 3,638,217 | 1/1972 | Sutherland | 340/807 |
| 3,750,138 | 7/1973 | Burgan et al. | 340/378.2 |
| 3,866,171 | 2/1975 | Loshbough | 340/715 |
| 4,109,245 | 8/1978 | Hedin | 340/808 |

Primary Examiner—Marshall M. Curtis
Attorney, Agent, or Firm—Reising, Ethington, Barnard, Perry & Brooks

[57] ABSTRACT

A message display monitor for a bus is disclosed in combination with a bus destination sign. A changeable alphanumeric destination sign (10) is automatically controlled by a control system (16) to display a selected message from a message memory (14). The message is selected by a manually actuated selector (12) which addresses the memory (14) according to a manual input which is specified in a look-up table which contains multiple messages. An electronic alphanumeric display monitor (18), specifically an LED display, is connected with the message memory (14) through a monitor control system (20) so that it will show the bus driver the message selected from the memory.

3 Claims, 6 Drawing Figures

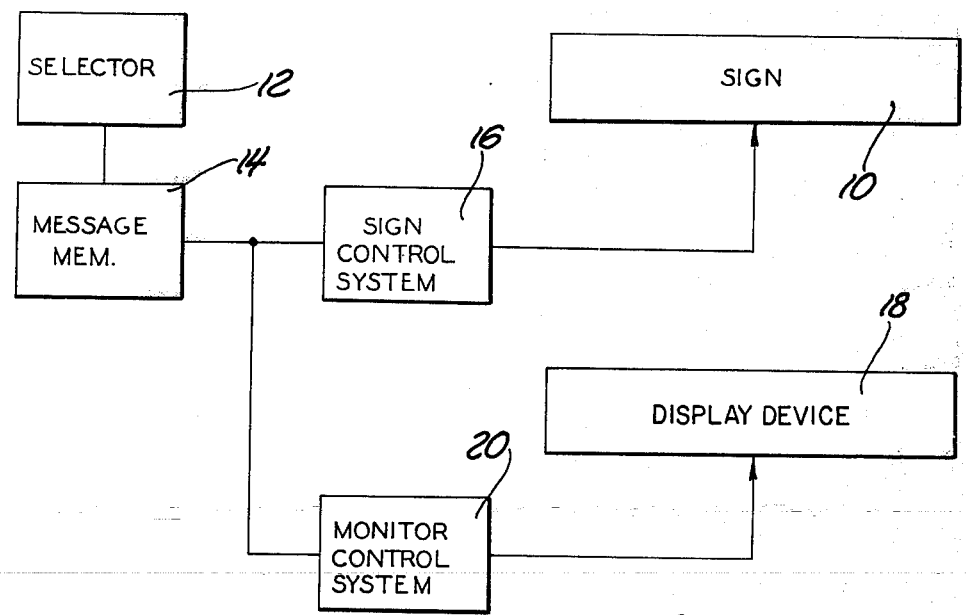
Fig. 1
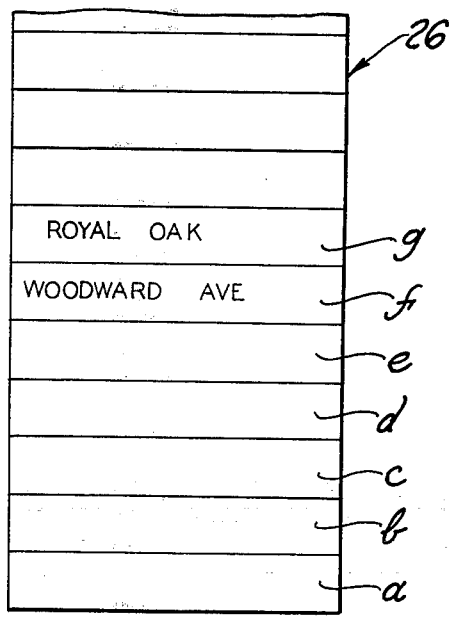
Fig. 4
```
☐ = 0 0 0 0 0 0
1   0 0 0 0 0 1
2   0 0 0 0 1 0
3   0 0 0 0 1 1
─────────────────
X   1 1 1 0 1 1
Y   1 1 1 1 0 0
Z   1 1 1 1 0 1
```
Fig. 6

Fig. 5

| | D7 | D6 | D5 | D4 | D3 | D2 | D1 | D0 |
|---|---|---|---|---|---|---|---|---|
| 1111 | | | | | | | | |
| 1111 | 1/32 | 2/32 | 3/32 | 4/32 | 5/32 | 6/32 | 7/32 | 8/32 |
| 1101 | 9/32 | 10/32 | 11/32 | 12/32 | 13/32 | 14/32 | 15/32 | 16/32 |
| 1100 | 17/32 | 18/32 | 19/32 | 20/32 | 1/16 | 2/16 | 3/16 | 4/16 |
| 1011 | 5/16 | 6/16 | 7/16 | 8/16 | 9/16 | 10/16 | 11/16 | 12/16 |
| 1010 | 13/16 | 14/16 | 15/16 | 16/16 | 17/16 | 18/16 | 19/16 | 20/16 |
| 1001 | 1/8 | 2/8 | 3/8 | 4/8 | 5/8 | 6/8 | 7/8 | 8/8 |
| 1000 | 9/8 | 10/8 | 11/8 | 12/8 | 13/8 | 14/8 | 15/8 | 16/8 |
| 0111 | 17/8 | 18/8 | 19/8 | 20/8 | 1/4 | 2/4 | 3/4 | 4/4 |
| 0110 | 5/4 | 6/4 | 7/4 | 8/4 | 9/4 | 10/4 | 11/4 | 12/4 |
| 0101 | 13/4 | 14/4 | 15/4 | 16/4 | 17/4 | 18/4 | 19/4 | 20/4 |
| 0100 | 1/2 | 2/2 | 3/2 | 4/2 | 5/2 | 6/2 | 7/2 | 8/2 |
| 0011 | 9/2 | 10/2 | 11/2 | 12/2 | 13/2 | 14/2 | 15/2 | 16/2 |
| 0010 | 17/2 | 18/2 | 19/2 | 20/2 | 1/1 | 2/1 | 3/1 | 4/1 |
| 0001 | 5/1 | 6/1 | 7/1 | 8/1 | 9/1 | 10/1 | 11/1 | 12/1 |
| 0000 | 13/1 | 14/1 | 15/1 | 16/1 | 17/1 | 18/1 | 19/1 | 20/1 |

DATA OUTPUTS

MONITOR FOR BUS DESTINATION SIGNS

FIELD OF THE INVENTION

This invention relates to destination signs for buses, trains and the like; more particularly, it relates to a message monitor for displaying the selected name to the operator.

BACKGROUND ART

Automatically changeable printed signs are now commonly used for destination signs on buses and trains. Destination signs must be changeable according to the particular route of the vehicle and each sign must be capable of displaying a large number of different destination names. The typical destination name requires many different alphanumeric characters and the sign must be changeable quickly from one name to another. A destination sign, which is now in common use, is capable of displaying any desired destination name by forming multiple side-by-side alphanumeric characters with any desired character at a given character location. In such a destination sign, each character is formed by a character module which includes printed roller tapes for displaying any desired character by properly positioning the tapes in the module. The individual tapes of a module carry plural segments of different characters and the tapes of the module must be positioned relative to each other such that all segments of a given character may be displayed together. This sign has the advantage of being able to form any combination of characters with the use of relatively short display tapes. Such a destination sign is disclosed and claimed in U.S. Pat. No. 4,064,502 granted Dec. 20, 1977, to William H. Saylor et al.

In a changeable alphanumeric sign of the type referred to above, the changing of the sign from one destination name to another is entirely automatic. The operator of the vehicle merely selects the desired destination name by setting an input device to a number corresponding to the desired destination name. For example, the operator has at his drivers position a set of number wheels and a look-up table containing a list of destination names and the corresponding number. The desired destination name is selected by setting the number wheels to the number and the sign is automatically changed to display the selected name. The selected destination name is presented by an alphanumeric display of the sign on the front of the bus and, in most cases, at another sign on the side of the bus. These destination signs are not within the view of the vehicle operator.

Because of the large number of destination names on the operators look-up table and because of human error, there is some chance that the wrong destination name will be selected. Such an error may also occur because of malfunction in the automatic sign itself. It is desirable, therefore, to provide means for reducing the likelihood of a wrong name being displayed by the destination sign.

A general objective of this invention is to provide a message monitor in combination with a bus destination sign.

SUMMARY OF THE INVENTION

In accordance with this invention, an alphanumeric message monitor is combined with a changeable alphanumeric bus destination sign so that the bus driver can verify from inside the bus whether the destination name selected for the destination sign is correct. This is accomplished by an electronic alphanumeric display device which has its input coupled with the coded output of the message or name memory from which the selection is made. In particular, the message data from the memory is applied by means of a sign control system to the changeable alphanumeric destination sign and the same message data is applied by way of a monitor control system to the electronic alphanumeric display monitor.

DESCRIPTION OF THE DRAWING

FIG. 1 is a block diagram of the destination sign with the message monitor of this invention, FIGS. 2 and 3 taken together show a schematic diagram of this invention, FIG. 4 shows an example of memory allocation, FIG. 5 depicts a memory map, and FIG. 6 shows a special code for storing messages in the message memory.

BEST MODE FOR CARRYING OUT THE INVENTION

Figure 2:
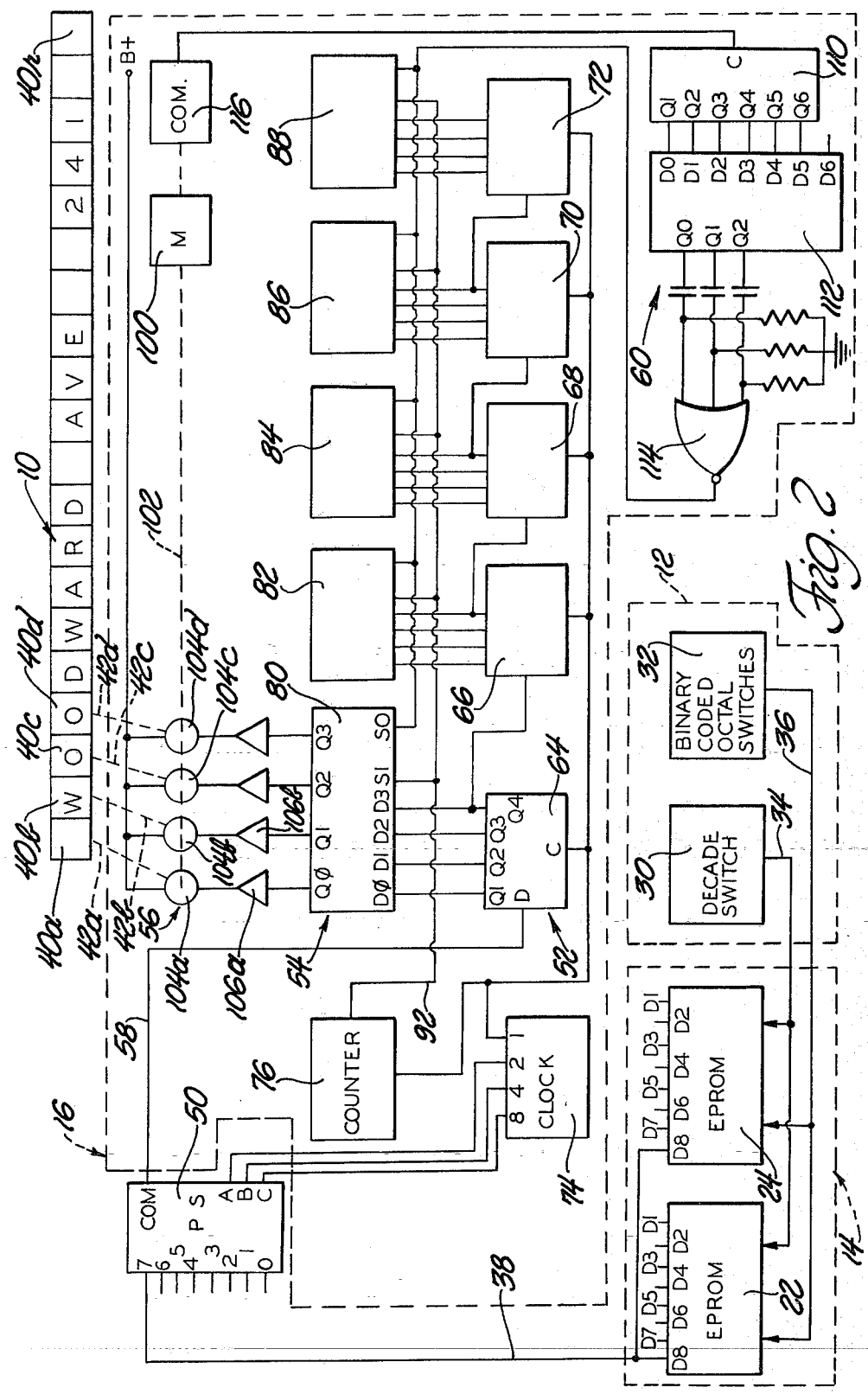

Referring now to the drawings, there is shown an illustrative embodiment of this invention in an electronic alphanumeric message monitor in combination with alphanumeric bus destination sign of the type which uses an electromechanical character modules each of which is capable of forming multiple alphanumeric characters by combining character segments. In this illustrative embodiment, a large number of destination names (hereinafter referred to as messages) are stored in memory in a special binary digit code. This special code is especially adapted for use with the electromechanical alphanumeric sign of the illustrative embodiment. Since the electronic alphanumeric display device is especially adapted to receive standard ASCII code, the monitor control system includes a code converter. It will be appreciated as the description proceeds that different codes may be used for use with the sign control system and with the monitor control system.

The message monitor, according to this invention, is shown in FIG. 1 in block diagram. The system comprises a destination sign 10 which is adapted to display a message which is selected from a list of messages. The list of messages is stored in a message memory 14. A manually actuated selector 12 is coupled with the memory 14 and selects a single message at a time from the memory. The output of the memory 14 is coupled with a sign control system 16 which in turn is coupled with the sign 10 to cause it to display the selected message. The message monitor comprises an electronic alphanumeric display device for displaying the message which is selected from the list of messages in memory 14. For this purpose, the output of the memory 14 is coupled to a monitor control system 20 which in turn is coupled to the device 18 to cause it to display the selected message.

The Selector and Message Memory

The message memory 14, as shown in FIG. 2, comprises a set of read only memories, more specifically, eraseable programmable read only memories (EPROM) 22 and 24. Each EPROM, for example, contains 64 different messages with each message being stored in a block of 16 bytes. The EPROM 22 may be depicted as shown in FIG. 4 wherein each block a, b, c etc. is a 16 byte block and represents a message stored in a special code. A memory block 26 encoded with the special code is illustrated in the memory map as shown in FIG. 5. The code, which represents a set of 40 alphanumeric characters (including a blank space), is shown in FIG. 6. The special code and the storage allocation of the code bits in the memory block is adapted to meet the requirements of the sign control system 16, as will become apparent subsequently.

The sign 10 is adapted to display a message containing up to twenty alphanumeric characters and spaces. The memory block 26, as indicated in FIG. 5 is accessable by eight data lines D0 through D7. As shown in FIG. 5, the ones bits for all twenty characters are stored together in row zero, columns D0 through D7, in row one, columns D0 through D7 and in row two, columns D0 through D3. All of the twos bits are stored together in row two, columns D4 through D7, in row three, columns D0 through D7 and in row four, columns D0 through D7. The fours bits, eights bits, sixteens bits and the thirty-twos bits are similarly stored together. The memory map of FIG. 5 has each memory position marked with a character position number one through twenty. This indicates that all of the bits marked with the number 20, for example, belong to the code word for the character in the twentieth position in the message.

For the purpose of selecting a given message from the message memory 14, the selector 12 is provided with manually actuated selector switches 30 and 32. The location of each message is suitably specified in a look-up table which shows a decimal number for the EPROM where the message is located and also shows a binary number for the memory block within that EPROM. As shown in FIG. 2, selector switch 30 is a decade switch and is coupled through an address bus 34 to each EPROM for selecting one of them. Selector switch 32 comprises a pair of binary coded octal switches which are coupled through an address bus 36 to each of the EPROMS for addressing the memory block containing the selected message. The content of the memory block, as indicated in FIG. 5, is output in eight-bit parallel form over the data bus 38 to the input of the sign control system 16. Thus, the memory block containing the selected message is read out line by line beginning with row 0 and ending with row 15. As discussed above, all of the ones bits for the selected message are read first followed by all of the twos bits which in turn are followed by all of the fours bits etc. for all of the 20 characters of the message. This data is processed by the sign control system 16 so that it may be used for actuating each of the sign modules to display the appropriate characters for producing the selected message.

The Sign Control System

As discussed above and described in U.S. Pat. No. 4,067,006, the sign 10 is comprised of a character module 40 for each character position in the sign. In the example being described, there are 20 modules in the sign 10. Each module comprises a set of opaque tapes with each tape being disposed on a pair of rollers and having a pattern of character segments printed thereon. Each of the character segments on a given tape may be presented, one segment at a time, by advancing the tape from one roller to the other. All of the tapes of the module are related to each other so that the character segments of the respective tapes form a composite image in the form of an alphanumeric character. All of the tapes of a module are advanced in synchronism so that 40 different characters may be displayed in sequence by positioning the module shaft at 40 different angular positions. The sign control system 16 is adapted to position each one of the module shafts 42a, 42b, 42c, etc. in an angular position so that the corresponding sign module displays a character appropriate for creating the message represented by the data supplied to the sign control system from the memory.

The output of the message memory 14 is applied to the input of the sign control system 16 through a parallel to serial converter 50. The sign control system 16 comprises, in general, a data byte allocating means 52, character word storage means 54, module actuating means 56, and a shift signal generator 60.

The parallel to serial converter 50 has its input connected with the data bus 38 and receives eight data bits in parallel. The converter 50 has a serial output data line 58 which supplies the data to the data byte allocating means 52. The allocating means 52 comprises a set of shift registers 64, 66, 68, 70 and 72. Each of the shift registers is a four stage register with outputs Q1, Q2, Q3 and Q4 and has a clock input C and a data input D. The serial data line 58 from the converter 50 is coupled to the data input of the register 64 and the Q4 output of each register is coupled to the data input of the succeeding register. A clock 74 is coupled with the clock inputs of all of the registers and the data is shifted one bit position in response to each clock pulse. After the occurrence of the first 20 clock pulses, all of the ones bits are held in the registers 64, 66, 68, 70 and 72. The Q outputs of the shift registers are connected with the character word storage means 54.

The character word storage means 54 comprises a set of five first in - first out registers 80, 82, 84, 86 and 88. Each first in - first out register has four data inputs D0, D1, D2 and D3 which are coupled respectively with the output Q0, Q1, Q2 and Q3 of the corresponding shift register. Also, each of the first in - first out registers has shift-in input SI and a shift-out input SO. A new word counter 76 is connected with the clock 74 and produces a shift-in pulse when the clock pulse count reaches 20 and each succeeding multiple thereof. The shift-in pulses from the output of the new word counter 76 are applied through a line 92 to each of the shift-in inputs SI of the respective registers 80, 82, 84, 86 and 88. Thus, when the first 20 data bits (all of the ones bits) are stored in their respective positions in the shift registers 64, 66, 68, 70 and 72, the shift-in pulse is effective to transfer the ones bits in parallel to the respective first in - first out registers 80, 82, 84, 86 and 88. Similarly, when all of the twos bits are stored in the shift registers, the next shift-in pulse transfers the bits in parallel to the first in - first out registers. This is repeated for the fours bits, eights bits, the sixteens bits and the thirty-twos bits. Accordingly, the first in - first out registers hold the entire set of data for the selected message. The data is allocated so that all of the bits for the first character are accessable from the output Q0 of the register 80 in the first in - first out order. Likewise, all of the bits for the second character of the message are at the output Q1 of register 80 and the data bits for each of the succeeding characters are accessable at the succeeding Q outputs.

The outputs of the first in - first out registers 80, 82, 84, 86 and 88 are used to control the advancement of each of the sign module shafts from a reference or home position. All of the shafts are driven by a motor 100 having a driveshaft 102 which is connected with each of the module shafts through a respective clutch 104a, 104b, 104c, etc. The clutches are eletromagnetically actuated and are individually controlled so that each module shaft 42a, 42b, 42c, etc. may be advanced a selected distance according to the alphanumeric character which is to be displayed by the respective module.

For this purpose, the character words for each respective module are shifted out of the first in - first out registers under the control of the shift-out signal generator 60. The shift pulse generator 60 comprises a counter 110, a priority encoder 112 and a NOR gate 114. A commutator 116 is rotatable with the shaft 102 and produces one output pulse for each increment of shaft rotation corresponding to advancement of a character module by one character segment. With forty character segments per module, it may be considered that the commutator produces 40 pulses per update cycle. The commutator pulses are applied to the clock input of the counter 110 and the output thereof on outputs Q1 through Q6 represents the pulse count and hence the shaft position. The output of the counter 110 is applied to the data inputs D0 through D6 of the priority encoder 112. The outputs of the encoder, namely Q0, Q1 and Q2 are applied through respective resistor-capacitor circuits to the inputs of the NOR gate 114. The priority encoder 112 produces an output in binary form which is equal to the most significant bit value present at the input. The output of the NOR gate 114 is a train of shift-out pulses which are spaced at increasing intervals of shaft rotation. In particular, the first shift-out pulse occurs concurrently with the first commutator pulse, the second shift-out pulse occurs with the second commutator pulse, the third shift-out pulse occurs with the fourth commutator pulse, the fourth shift-out pulse occurs with the eighth commutator pulse, the fifth shift-out pulse occurs with the sixteenth commutator pulse and the sixth shift-out pulse occurs with the thirty-second commutator pulse. The output of the NOR gate 114 is coupled to each of the inputs S0 of the first in - first out registers 80 through 88.

As described above, the character word for module 40a is held in first in - first out register 80 and is accessable at the output Q0; the successive bits of this character word appear at the output Q0 in response to successive shift out pulses applied to the S0 input of the register 80. The output Q0 is coupled through a driver amplifier 106a to the clutch 104a and a logical high bit at output Q0 causes the clutch 104a to be engaged to drive the module shaft 42a and advance the position of the tapes in the module 40a. The logical high at the output Q0, and hence the driving of the module 40a, will continue until a logical low bit is shifted out of Q0. Thus, if the next character bit is a logical low the clutch 104a will be disengaged and the module 40a will stop; if it is logical high the clutch 104 will remain engaged and the advancement of the module 40a will continue. The successive bits of the character words for all of the modules 40a through 40r are shifted out successively by the shift out pulses from the generator 60. Thus, the selected message is displayed by the sign 10.

The Monitor Control System

The monitor control system 20, as alluded to with reference to FIG. 1, is adapted to control the display presented by the display device 18. The purpose of the device 18, in accordance with this invention, is to display the message selected by the operator by the manual selector switches 30 and 32 in the selector 12. Thus, the operator may verify from the device 18 that he has selected the desired message without the need for viewing the sign 10 itself. Further, according to the invention, it is desired to use a device 18 comprised of electronic display elements, such as LED displays, which are adapted for a standard code input, normally ASCII. The monitor control system 20 is adapted to accept the data on the data line 58 and produce an output for the monitor 18 which represents, in ASCII code, the message selected from the message memory 14.

Figure 3:
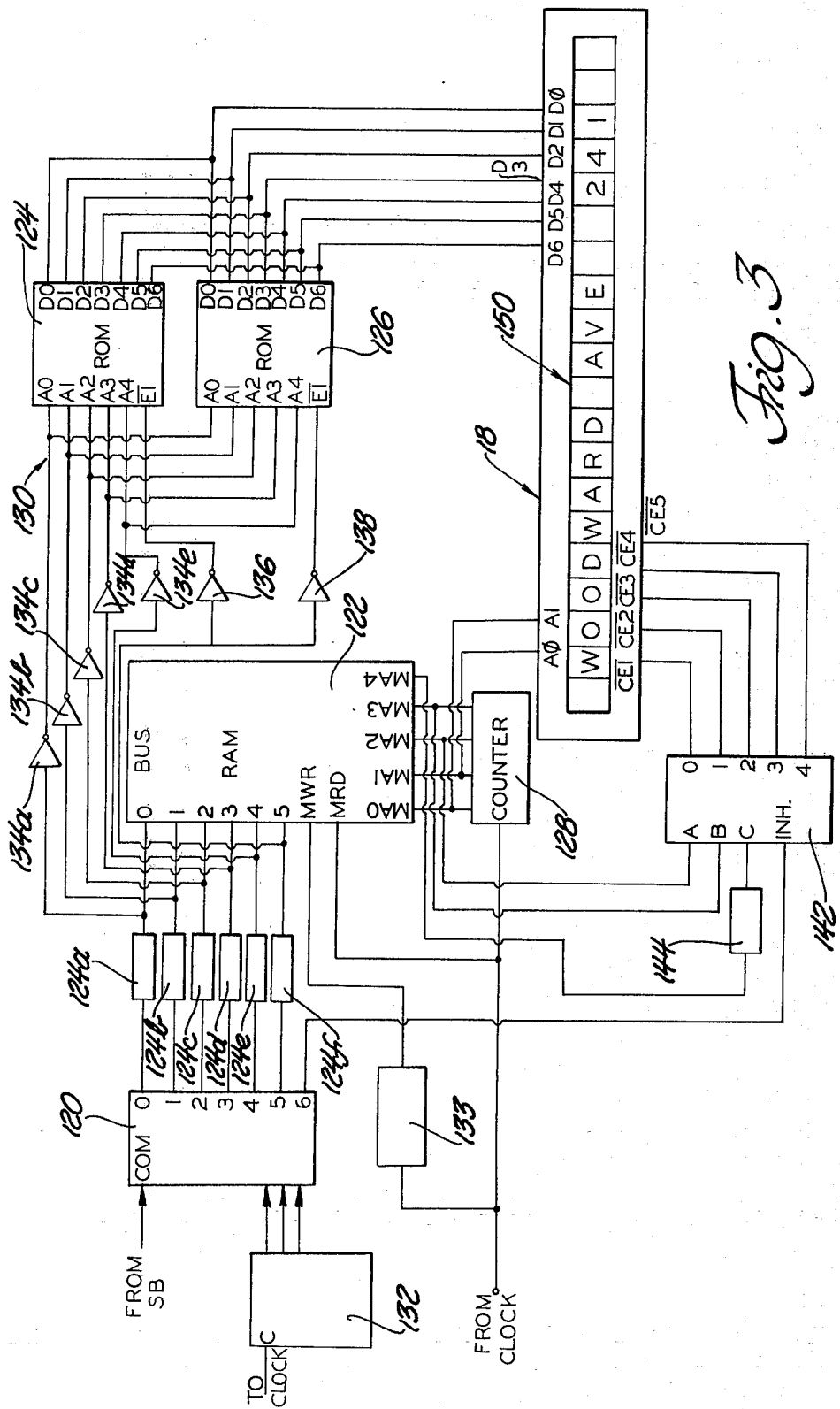

The monitor control system 20 is shown in FIG. 3. The control system comprises, in general, a multiplexer 120 which receives the data and transmits it to a temporary storage, namely a random access memory (RAM) 122. The contents of the RAM 122 are read out and applied to a code conversion means in the form of read only memories (ROM) 124 and 126. The outputs of the ROMS are applied to the display device 18 which comprises a conventional seven segment LED display 150 which accepts ASCII code.

The multiplexer 120 has it common input COM connected with the output of the parallel to serial converter 50 on the data line 58. A binary counter 132 has an input connected with the output of the counter 76. The output of the counter 132 is applied to the inputs A, B and C of the multiplexer 120. The outputs 0 through 5 of the multiplexer are sequentially connected with the data input in response to successive new word counts at the inputs A, B and C. Thus, the first word in the serial data (the first 20 data bits, which are all ones-bits) appears at output 0 of the multiplexer. The second word (twenty twos-bits) appear at output 1, the third word appears at output 2, and so on. Each output of the multiplexer 120 is connected with a respective input-output of the RAM 122 through a respective bidirectional latch. In particular, output 0 of the multiplexer is connected through a latch 124a to the input-output BUS 0 of the RAM 122, output 1 is connected with the input-output BUS 1 through latch 124b, output 2 is connected with input-output BUS 2 through latch 124c and so on. The RAM 122 has address lines MA0 through MA3 which are connected with the output of a counter 128 which has its input connected with the clock. Each clock pulse increments the memory position for the incoming data bits so that the ones-bits are stored in a single row corresponding to input-output BUS 0 and in twenty adjacent columns. Similarly, the twos-bits are stored in a single row corresponding to BUS 1 and in twenty adjacent columns, and so on for the remaining bits of the message. The RAM 122 has a memory write input MWR and a memory read input MRD. The memory write input MWR receives an input signal from the clock 74 through a timing circuit 133 and the clock signal is applied directly to the memory read input MRD. In this arrangement, the memory write input and the memory read input are enabled alternately in synchronism with the clock pulses. Accordingly, each data bit is written into the RAM 122 and then read out of the RAM before the succeeding bit is written into in the RAM. For example, the ones bit from output 0 of the multiplexer 120 is applied through the latch 124a to the input-output BUS 0 and is written into the RAM by the signal applied to the memory write input MWR and then it is read out of the memory by the read signal on input MRD. This process continues until all of the ones bits are stored in the RAM 122 and then the twos bits, fours bits etc. are read in and read out of the RAM in the same manner. Note that the latches 124a, 124b, 124c etc. give priority to the signal on the input side. The data stored in the RAM 122 is supplied in parallel, in a manner described below, to the code converter 130 after a full message has been stored in the RAM.

The code converter 130 comprises a read only memory (ROM) 124 and a ROM 126. For the purpose of supplying the message data from the RAM 122 to the ROMS 124 and 126, each input-output BUS 0, BUS 1, BUS 2 etc. is connected through a respective buffer 134a, 134b, 134c etc. to the respective inputs A0 through A4 of the ROMS 124 and 126. The input-output BUS 5 is connected through a buffer 136 to the enable input E1 of ROM 124 and is connected through a complementary buffer 138 to the enable input E1 of ROM 126. Thus, the message represented in the special code is supplied in parallel, character by character, from the RAM 122 to the code converter 130.

As stated above, the code converter 130 is adapted to convert the special code to the standard ASCII code. The output of the code converter 130 is derived from outputs D0 through D6 on both ROMS 124 and 126. This output is applied to the data inputs D0 through D6 of the LED display 150. As discussed above, the LED display 150 is adapted to respond directly to ASCII code. The display comprises a set of 5 LED chips with 4 characters per chip to provide the 20 character display of the message. In order to address each character of the display with its respective character data, a multiplexer 142 is provided. The multiplexer has its inputs A and B connected respectively with the memory address inputs MA2 and MA3 of the RAM 122 and the input C connected with the memory address input MA4 through a NOR latch 144. This provides an input to the multiplexer 142 which represents a binary number corresponding to the LED chip which is to receive the data representing the character to be displayed. The multiplexer 142 produces chip enable signals on outputs 0 through 4. The chip enable signals are applied to the chip enable inputs CE1 through CE5 on the display 150. The display also has inputs A0 and A1 for selecting the individual character position within each chip. These inputs are connected with the memory address lines MA0 and MA1 of the RAM 122. Thus the LED display 150 displays the message selected from memory 14 as described above.

Although the description of this invention has been given with reference to particular embodiment, it is not to be construed in a limiting sense. Many variations of modifications of the invention will now occur to those skilled in the art. For a definition of the invention reference is made to the appended claims.

What is claimed is:

1. A bus destination sign of the type comprising a changeable alphanumeric display device, said device being electromechanically actuated to change from one display to another, the display being persistent until re-actuated, a message memory for storing multiple messages in a binary digit code, manually controlled selector means coupled with the memory for accessing the memory to continuously produce a coded signal corresponding to a selected one of the messages, and sign control means coupled with the memory and responsive to said coded signal for changing the alphanumeric display device to display a message corresponding to the coded signal produced by said memory, the improvement comprising a message monitor including an electronic alphanumeric display device having electronic display elements, and monitor control means coupled between said memory and said display device and being responsive to the output of said memory for causing the electronic display device to display a message corresponding to the coded signal produced by said memory whereby the message displayed by the electronic display device may be compared with the selected message.

2. The invention as defined in claim 1 wherein said message memory is a programmable read only memory having a multiple bit parallel output and means coupled with the output of said memory and the input of said sign control means and said monitor control means for applying said coded signal thereto whereby said destination sign display device and said monitor display device display the same message.

3. The invention as defined in claim 2 wherein the messages are stored in the message memory in a first code, said means coupled with the output of said memory is a parallel to serial converter, said parallel to serial converter being coupled to said sign control means, said monitor control means including a multiplexing means and a random access memory for processing the serial data from said parallel to serial converter to produce parallel data, said random access memory having a multiple bit parallel output, and a code converter coupled with the output of said random access memory, said code converter being connected with said electronic alphanumeric display device for displaying said message.

* * * * *